United States Patent [19]

Villiger et al.

[11] Patent Number: 5,661,197
[45] Date of Patent: Aug. 26, 1997

[54] ERASABLE INK COMPOSITION CONTAINING A POLYMER-ENCAPSULATED COLORANT DERIVED FROM MONOMER CONTAINING DISSOLVED COLORANT

[75] Inventors: David C. Villiger, Greenville; Aiying Wang, Simpsonville; Jeffery H. Banning, Spartanburg; Wayne A. Chandler, Mauldin; Barry W. Chadwick, Simpsonville, all of S.C.

[73] Assignee: BIC Corporation, Milford, Conn.

[21] Appl. No.: 650,597

[22] Filed: May 20, 1996

Related U.S. Application Data

[63] Continuation of Ser. No. 359,876, Dec. 20, 1994, abandoned.

[51] Int. Cl.$^6$ ...................... C09D 11/18
[52] U.S. Cl. .......... 523/161; 523/200; 523/205; 524/458; 524/460; 260/DIG. 38; 401/209; 106/31.32; 106/31.45
[58] Field of Search ............... 523/161, 200, 523/205; 524/458, 460; 260/DIG. 38; 106/21 A, 22 R, 23 R, 23 B; 401/209

[56] References Cited

U.S. PATENT DOCUMENTS

| | | | |
|---|---|---|---|
| 3,383,346 | 5/1968 | Smith | 524/745 |
| 3,544,500 | 12/1970 | Osmond et al. | 428/402.24 |
| 3,875,105 | 4/1975 | Daugherty et al. | 523/161 |
| 3,884,871 | 5/1975 | Herman et al. | 523/202 |
| 3,904,562 | 9/1975 | Hopfenberg et al. | 523/260 |
| 3,935,340 | 1/1976 | Yamaguchi et al. | 427/216 |
| 3,949,132 | 4/1976 | Seregely et al. | 428/207 |
| 3,965,032 | 6/1976 | Gibbs et al. | 252/306 |
| 4,048,136 | 9/1977 | Kobayashi et al. | 524/439 |
| 4,059,554 | 11/1977 | Pacansky | 524/386 |
| 4,097,290 | 6/1978 | Muller et al. | 106/413 |
| 4,137,083 | 1/1979 | Hedrick | 106/2 R |
| 4,194,920 | 3/1980 | Burke, Jr. et al. | 523/260 |
| 4,212,676 | 7/1980 | Ueda | 106/19 B |
| 4,227,930 | 10/1980 | Lin | 106/19 A |
| 4,256,494 | 3/1981 | Yamamoto et al. | 106/22 A |
| 4,264,700 | 4/1981 | Bayley | 430/137 |
| 4,329,262 | 5/1982 | Muller | 523/161 |
| 4,329,264 | 5/1982 | Muller | 523/161 |
| 4,349,639 | 9/1982 | Muller | 523/161 |
| 4,357,431 | 11/1982 | Murakami et al. | 523/161 |
| 4,367,966 | 1/1983 | Williams et al. | 401/190 |
| 4,368,076 | 1/1983 | Iijima | 106/22 F |
| 4,379,867 | 4/1983 | Noriaki | 523/161 |
| 4,389,499 | 6/1983 | Riesgraf | 523/161 |
| 4,390,646 | 6/1983 | Ferguson | 523/161 |
| 4,391,927 | 7/1983 | Farmer, III | 523/161 |
| 4,407,985 | 10/1983 | Muller | 523/161 |
| 4,410,643 | 10/1983 | Muller | 523/161 |
| 4,419,464 | 12/1983 | Williams et al. | 523/161 |
| 4,421,660 | 12/1983 | Solc nee Hajna | 252/62.54 |
| 4,441,928 | 4/1984 | Iijima | 106/21 A |
| 4,471,079 | 9/1984 | Enami | 523/161 |
| 4,509,982 | 4/1985 | Iijima | 106/23 B |
| 4,524,199 | 6/1985 | Lok et al. | 527/313 |
| 4,525,216 | 6/1985 | Nakanishi | 106/30 B |
| 4,532,276 | 7/1985 | Knäble et al. | 524/18 |
| 4,545,818 | 10/1985 | Inoue et al. | 106/22 F |
| 4,557,618 | 12/1985 | Iwata et al. | 401/34 |
| 4,578,117 | 3/1986 | Nakanishi | 106/20 A |
| 4,596,846 | 6/1986 | Bohne et al. | 524/173 |
| 4,606,769 | 8/1986 | Tanaka et al. | 106/30 R |
| 4,629,748 | 12/1986 | Miyajima et al. | 523/161 |
| 4,652,508 | 3/1987 | Ober et al. | 430/109 |
| 4,665,107 | 5/1987 | Micale | 523/105 |
| 4,671,691 | 6/1987 | Case et al. | 401/142 |
| 4,680,200 | 7/1987 | Sole | 427/213.34 |
| 4,686,246 | 8/1987 | Gajria | 523/161 |
| 4,687,791 | 8/1987 | Miyajima et al. | 523/161 |
| 4,693,846 | 9/1987 | Piccirilli et al. | 106/29 R |
| 4,721,739 | 1/1988 | Brenneman et al. | 523/161 |
| 4,726,845 | 2/1988 | Thompson et al. | 106/25 A |
| 4,738,725 | 4/1988 | Daugherty et al. | 106/32 |
| 4,760,104 | 7/1988 | Miyajima et al. | 523/161 |
| 4,770,706 | 9/1988 | Pietsch | 106/24 R |
| 4,786,198 | 11/1988 | Zgambo | 401/142 |
| 4,789,399 | 12/1988 | Williams et al. | 106/20 R |
| 4,830,670 | 5/1989 | Danyu | 106/23 B |
| 4,874,832 | 10/1989 | Jabs et al. | 528/60 |
| 4,889,877 | 12/1989 | Seitz | 523/161 |
| 4,936,916 | 6/1990 | Shinmitsu et al. | 106/21 E |
| 4,940,628 | 7/1990 | Lin et al. | 428/207 |
| 4,940,738 | 7/1990 | Sietz | 523/161 |
| 4,942,185 | 7/1990 | Inoue et al. | 521/54 |
| 4,954,174 | 9/1990 | Imagawa | 106/27 R |
| 4,960,464 | 10/1990 | Chen | 106/19 D |
| 4,971,628 | 11/1990 | Loftin | 106/22 F |
| 4,985,484 | 1/1991 | Yoshida et al. | 524/379 |
| 5,004,763 | 4/1991 | Imagawa | 523/161 |
| 5,009,536 | 4/1991 | Inoue et al. | 401/198 |
| 5,010,125 | 4/1991 | Kruse et al. | 524/308 |
| 5,013,361 | 5/1991 | Case et al. | 106/22 F |
| 5,017,225 | 5/1991 | Nakanishi et al. | 106/21 A |
| 5,024,700 | 6/1991 | Britton, Jr. | 106/32 |
| 5,024,898 | 6/1991 | Pitts et al. | 428/511 |
| 5,037,702 | 8/1991 | Pitts et al. | 428/423.7 |
| 5,048,992 | 9/1991 | Loftin | 401/209 |
| 5,082,495 | 1/1992 | Iijima | 106/21 A |
| 5,102,856 | 4/1992 | Doll et al. | 503/209 |

(List continued on next page.)

FOREIGN PATENT DOCUMENTS

| | | |
|---|---|---|
| 0054832 | 6/1982 | European Pat. Off. . |
| 0209879 | 1/1987 | European Pat. Off. . |
| 0556668 | 8/1993 | European Pat. Off. . |
| 1-289881 | 11/1989 | Japan . |
| WO8301625 | 5/1983 | WIPO . |
| WO9312175 | 6/1993 | WIPO . |
| WO9324565 | 12/1993 | WIPO . |

*Primary Examiner*—Paul R. Michl
*Assistant Examiner*—John J. Guarriello
*Attorney, Agent, or Firm*—Dilworth & Barrese

[57] ABSTRACT

An erasable ink composition contains an aqueous dispersion of water-insoluble polymer-encapsulated colorant obtained from the emulsion polymerization of at least one hydrophobic emulsion-polymerizable monomer with at least a portion of the monomer containing colorant dissolved therein. The ink is intended for use in any of a variety of marking instruments, in particular, a ball-point pen.

15 Claims, No Drawings

U.S. PATENT DOCUMENTS

| | | | |
|---|---|---|---|
| 5,106,881 | 4/1992 | Inoue et al. | 521/54 |
| 5,114,479 | 5/1992 | Keaveney et al. | 106/30 R |
| 5,120,359 | 6/1992 | Uzukawa et al. | 106/20 A |
| 5,120,360 | 6/1992 | Tajiri et al. | 106/21 E |
| 5,124,400 | 6/1992 | Tirpak et al. | 524/591 |
| 5,160,369 | 11/1992 | Parkinson et al. | 106/19 R |
| 5,203,913 | 4/1993 | Yamamoto et al. | 106/22 B |
| 5,217,255 | 6/1993 | Lin et al. | 281/15.1 |
| 5,336,307 | 8/1994 | Horvat et al. | 106/19 B |
| 5,338,775 | 8/1994 | Matz et al. | 523/161 |
| 5,348,989 | 9/1994 | Shiraishi | 523/161 |

ERASABLE INK COMPOSITION CONTAINING A POLYMER-ENCAPSULATED COLORANT DERIVED FROM MONOMER CONTAINING DISSOLVED COLORANT

This is a continuation of application Ser. No. 08/359,876 filed on Dec. 20, 1994 now abandoned.

BACKGROUND OF THE INVENTION

This invention relates to an erasable ink composition and to a marking instrument, e.g., a ball-point pen, containing the composition. More particularly, this invention relates to an erasable ink composition containing an aqueous dispersion of a polymer-encapsulated colorant.

Numerous erasable ink compositions are known, e.g., those described in U.S. Pat. Nos. 3,834,823, 3,875,105, 3,949,132, 4,097,290, 4,212,676, 4,227,930, 4,256,494, 4,297,260, 4,329,262, 4,329,264, 4,349,639, 4,357,431, 4,367,966, 4,368,076, 4,379,867, 4,389,499, 4,390,646, 4,391,927, 4,407,985, 4,410,643, 4,419,464, 4,441,928, 4,509,982, 4,525,216, 4,557,618, 4,578,117, 4,596,846, 4,606,769, 4,629,748, 4,687,791, 4,721,739, 4,738,725, 4,760,104, 4,786,198, 4,830,670, 4,954,174, 4,960,464, 5,004,763, 5,024,898, 5,037,702, 5,082,495, 5,114,479, 5,120,359, 5,160,369 and 5,217,255. These inks are formulated by mixing a colorant (taken herein to also include "pigment", "dye", "chromophore" and other terms of similar meaning) with a variety of polymer and liquid carrier/solvent combinations thereby forming a flowable colorant/polymer matrix. The polymer component is chosen for its film forming properties and its ability to be readily removed from the substrate to which it is applied, e.g., cellulosic paper, through the abrasive action of an eraser. However, a common problem with these erasable ink compositions concerns the residual colorant which remains after erasure. Incomplete erasure may be attributed to inadequate removal of the colorant/polymer matrix from the paper substrate and/or migration of colorant into the pores of the substrate.

SUMMARY OF THE INVENTION

In accordance with the present invention an erasable ink composition is provided which comprises an aqueous dispersion of a water-insoluble polymer-encapsulated colorant obtained by polymerizing under emulsion polymerization conditions at least one hydrophobic emulsion-polymerizable monomer with at least a portion of the monomer containing colorant dissolved therein.

Since the colorant is encapsulated by polymer in the erasable ink composition of this invention, there is little opportunity for it to separate from the polymer and migrate into a porous substrate. Thus, the erasable ink composition of this invention is apt to leave significantly less residual colorant following its erasure than known erasable ink compositions in which the colorant is merely physically combined with the polymer component(s).

The expression "polymer-encapsulated colorant" shall be understood herein to refer to any association of colorant and polymer in which the colorant is physically bound or occluded by, or entrapped within, the polymer. The term "polymer-encapsulated colorant" excludes those materials in which colorant is bound to the polymer primarily through van der Waals forces, hydrogen bonding, ionic bonding and/or covalent bonding.

The term "colorant" shall be understood herein to refer to any water-insoluble color-imparting substance which is soluble, or capable of being made soluble, in at least one of the monomers used in obtaining the colorant encapsulating polymer and which is chemically inert with respect to such monomer and the resulting polymer.

The term "dissolved" as utilized herein shall be understood to include those cases in which: (1) colorant is dissolved directly in monomer in the absence of solvent(s), (2) a solution of colorant is dissolved in monomer, (3) colorant is dissolved in a solution of monomer and (4) a solution of colorant is dissolved in a solution of monomer.

DESCRIPTION OF THE PREFERRED EMBODIMENTS

The monomer employed in the practice of this invention, or at least the greater proportion thereof, is of the hydrophobic variety, i.e., the monomer forms a separate phase when 5 g thereof is mixed with 100 g of water. Hydrophobic monomer(s) will polymerize under emulsion polymerization conditions to form a water-insoluble polymer which will exist in the form of a stable aqueous dispersion, usually with the aid of suitable surface active agents. Examples of suitable hydrophobic monomers include monovinylidene aromatic monomers such as styrene, vinyl toluene, t-butyl styrene, chlorostyrene, vinylbenzyl chloride and vinyl pyridene; alkyl esters of $\alpha,\beta$-ethylenically unsaturated acids such as ethyl acrylate, methyl methacrylate, butyl acrylate and 2-ethylhexyl acrylate; unsaturated esters of saturated carboxylic acids such as vinyl acetate, unsaturated halides such as vinyl chloride and vinylidene chloride; unsaturated nitriles such as acrylonitrile; dienes such as butadiene and isoprene; and the like. Of these monomers, the monovinylidene aromatics such as styrene and the alkyl acrylates such as butyl acrylate are preferred.

In addition to the aforementioned hydrophobic monomers, relatively minor amounts, e.g., less than 10 and preferably less than 5, weight percent based on total monomer, of one or more water-soluble monomers can be copolymerized with the hydrophobic monomer(s). Illustrative of useful water-soluble monomers are ethylenically unsaturated carboxylic acids or their salts such as acrylic acid, sodium acrylate, methacrylic acid, itaconic acid and maleic acid; ethylenically unsaturated carboxamides such as acrylamide; vinyl pyrrolidone; hydroxyalkyl acrylates and methacrylates such as hydroxyethyl acrylate, hydroxypropyl acrylate and hydroxyethyl methacrylate; aminoalkyl esters of unsaturated acids such as 2-aminoethyl methacrylate; epoxy functional monomers such as glycidyl methacrylate; sulfoalkyl esters of unsaturated acids such as 2-sulfoethyl methacrylate; and, ethylenically unsaturated quaternary ammonium compounds such as vinylbenzyl trimethyl ammonium chloride. It is critical, however, that such water-soluble monomers not be employed in amounts sufficient to render the resulting polymer soluble in water. Particularly effective monomer recipes for the practice of this invention are those containing from about 20 to about 90 weight percent of styrene, from about 10 to about 80 weight percent of alkyl acrylate such as butyl acrylate and from about 0.01 to about 2 weight percent of the unsaturated carboxylic acids such as acrylic acid, with said weight percentages being based on the weight of total monomers.

The colorant utilized in the practice of this invention must be soluble in the discontinuous monomer phase, either directly or through the use of solvent(s), and substantially insoluble in the continuous aqueous phase of the dispersion which is formed prior to carrying out the emulsion polymerization operation. Suitable colorants include inorganic and organic pigments and oil-soluble dyes. Oil-soluble dyes found to be useful generally include members of the class of solvent dyes including some basic dyes. A solvent dye can be defined by its solubility in an organic solvent or solvents, e.g., toluene or xylene. Basic dyes are slightly water-soluble, moderately colored materials which are convertible to strong chromophores via interaction with acids or acidic polymers. Illustrative examples of dyes that can be used as colorants in the present invention are disclosed in U.S. Pat. No. 5,114,479 and include Sudan Red 380, Sudan Blue 670, Baso Red 546, Baso Blue 688, Sudan Yellow 150, Baso Blue 645, Flexo Yellow 110, and Flexo Blue 630, all commercially available from BASF; Oil Red 235, commercially available from Passaic Color and Chemical; Morfast Yellow 101, commercially available from Morton; Nitro Fast Yellow B, commercially available from Sandoz; Macrolex Yellow 6G, commercially available from Mobay. Other useful water-insoluble, monomer soluble colorants are disclosed in U.S. Pat. No. 5,203,913 and include Solvent Yellow 14, 16 and 21, Solvent Orange 45, 62, Solvent Red 1, 7, 8, 119 and 125, Solvent Blue 5, 14, 25 and 36 and Solvent Black 5 and 34. Mixtures of two or more of these colorants can be used to provide virtually any desired color by regulating the proportions of the individual colorants therein.

Further useful water-insoluble colorants are described in U.S. Pat. No. 4,874,832 and include dyestuff precursors selected from among the triphenylmethane compounds, diphenylmethane compounds, xanthene compounds, thiazine compounds and spiropyran compounds and mixtures thereof. In particular, the following are suitable: triphenylmethane compounds: 3,3-bis-(p-dimethylaminophenyl)-6-dimethylaminophthalide ("crystal violet lactone") and 3,3-bis-(p-dimethyl-amino-phenyl)-phthalide ("malachite green lactone"), diphenyl-methane compounds: 4,4-bis-dimethylaminobenzhydryl benzyl ether, N-2,4,5-trichlorophenylleucauramine, N-halogenophenylleucauramine, N-β-naphthylleucauramine, and N-2,4-dichlorophenylleucauramine; xanthene compounds: rhodamine-β-anilinolactam, rhodamine-β-(p-nitroaniline)-lactam, rhodamine-β-(p-chloroaniline)-lactam, 7-dimethylamine-2-methoxy-flouran, 7-diethylamine-3-methoxyfluoran, 7-diethylamine-3-methylfluoran, 7-diethylamine-3-chlorofluoran, 7-diethylamine-3-chloro-2-methylfluoran, 7-diethylamine-2,4-dimethylfluoran, 7-diethylamine-2,3-dimethylflouran, 7-diethylamine-(3-acetyl-methylamine)-fluoran, 7-diethyl-amine-3-methylfluoran, 3,7-diethyl-aminefluoran, 7-diethylamino-3-(dibenzylamine)-fluoran, 7-diethylamine-3-(methylbenzylamine)-fluorane), 7-diethylamine-3-(dichloroethylamine)-flouran and 7-diethylamine-3-(diethylamine)-fluoran; thiazine compounds: N-benzoylleucomethylene blue, o-chlorobenzoylleucomethylene blue and p-nitrobenzoylleucomethylene blue; and spiro compounds: 3-methyl-2,2'-spiro-bis-(benzo(f)-chromene).

Solvents which dissolve these dyestuff precursors include, e.g., chlorinated diphenyl, chlorinated paraffin, cottonseed oil, groundnut oil, silicone oil, tricresyl phosphate, monochlorobenzene, furthermore partially hydrogenated terphenyls, alkylated diphenyls, alkylated naphthalenes, aryl ethers, arylalkyl ethers, higher alkylated benzenes and others. Diluents, such as, for example, kerosine, n-paraffins and iso-paraffins, can be added to the solvents.

In the practice of this invention, a hydrophobic insoluble monomer/colorant solution is first provided, the solution then being dispersed in water to form an aqueous dispersion. The aqueous dispersion is thereafter subjected to emulsion polymerization conditions wherein the hydrophobic monomer undergoes polymerization to form polymer particles which encapsulate the colorant. Alternatively, aqueous dispersions of the monomer and colorant are separately formed and thereafter combined in a reactor and subjected to emulsion polymerization conditions to provide a composition containing polymer-encapsulated colorant.

More particularly, the monomer/colorant solution can be obtained by dissolving both the monomer and the colorant in a suitable organic solvent. The monomer and colorant can be dissolved in different solvents so long as the solvents are water-insoluble and miscible with each other. Alternatively, the colorant can be directly dissolved in the monomer. The monomer/colorant solution is thereafter introduced to an aqueous solution of water-soluble surface active agent or emulsifier and subjected to agitation using a high shear mixing device such as a Waring blender, homogenizer and/or ultrasonic mixer to form the desired dispersion containing dispersed monomer/colorant solution droplets. Alternatively, separate dispersions of monomer and colorant, respectively, can be formed and thereafter combined under agitation in a polymerization reactor during polymerization. As another alternative, the dispersion can be formed by adding monomer to a preformed aqueous dispersion containing colorant dispersed therein or by adding colorant to a preformed aqueous dispersion containing monomer dispersed therein. In such instances the monomer and/or colorant will dissolve directly in the discontinuous phase. It is often desirable to add additional surfactant or emulsifier to the preformed dispersion of monomer or colorant prior to or simultaneous with the addition of monomer or colorant. Where the colorant is added to a preformed emulsion of monomer the colorant should dissolve within the discontinuous monomer phase.

The aqueous dispersions are typically formed by contacting the liquid monomer and colorant or solution(s) thereof with an aqueous solution of water-soluble surfactant or emulsifier thereby forming the dispersion. The dispersion can contain from about 70 to about 99.5, and preferably from about 80 to 98, weight percent total monomer and, correspondingly, from about 0.5 to about 30, and preferably from about 2 to about 10, weight percent total colorant.

The hydrophobic monomer is present in the emulsion in a proportion sufficient to enclose or encapsulate the colorant when the monomer is polymerized. Sufficient surface active agent and/or emulsifier is present in the emulsion to provide an aqueous dispersion which is sufficiently stable to be subjected to emulsion polymerization conditions. Preferably, the emulsion contains from about 1 to about 30 weight percent monomer, from about 0.1 to about 25 weight percent colorant and a remaining amount of the aqueous phase including surfactant and/or emulsifier, catalyst and the like.

Typically, suitable surface active agents or emulsifiers include salts of fatty acids such as potassium oleate, metal alkyl sulfates such as sodium lauryl sulfate, salts of alkyl aryl sulfonic acids such as sodium dodecylbenzene sulfonate, polysoaps such as sodium polyacrylate and alkali metal salts of methyl methacrylate/2-sulfoethyl methacrylate copolymers and other sulfoalkyl acrylate copolymers, and other anionic surfactants such as the dihexyl ester of sodium sulfosuccinic acid; non-ionic surfactants such as the nonionic condensates of ethylene oxide with propylene oxide, ethylene glycol and/or propylene glycol; and cationic surfactants such as alkylamine-guanidine polyoxyethanols, as well as a wide variety of micelle generating substances described by D. C. Blackley in "Emulsion Polymerization", Wiley and Sons, Chapter 7 (1975) and other surfactants listed in McCutcheon's "Detergents and Emulsifers", 1980 Annual, North American Edition, McCutcheon, Inc., Morristown, N.J. Also included among the suitable surfactants are the surface active polymers (often called polysoaps), e.g., those described in U.S. Pat. No. 3,965,032. Of the suitable surfactants, the anionic varieties such as the potassium salts of functionalized oligomers, e.g., Polywet varieties sold by Uniroyal Chemical, are preferred. Such surface active agents or emulsifiers are employed in amounts sufficient to provide a stable dispersion of the monomer and dye in water. Preferably, such surface active agents are employed in concentrations in the range from about 0.2 to about 10, most preferably from about 1 to about 6, weight percent based on the aqueous phase.

The emulsion polymerization conditions employed in the practice of this invention are generally conventional free-radical type polymerizations carried out in the presence of a radical initiator such as a peroxygen compound, an azo catalyst, ultraviolet light and the like. Preferably, such polymerization is carried out in the presence of a water-soluble peroxygen compound at temperatures in the range of from about 50° to about 90° C. The emulsion is generally agitated during the polymerization period in order to maintain adequate feed transfer. The concentration is normally in the range of from about 0.005 to about 8, preferably from about 0.01 to about 5, weight percent based on total monomer. Examples of suitable catalysts include inorganic persulfate compounds such as sodium persulfate, potassium persulfate, ammonium persulfate; peroxides such as hydrogen peroxide, t-butyl hydroperoxide, dibenzoyl peroxide and dilauroyl peroxide; azo catalysts such as azobisisobutyronitrile, and other common free-radical generating compounds. Also suitable are various forms of free-radical generating radiation means such as ultra-violet radiation, electron beam radiation and gamma radiation. Alternatively, a redox catalyst composition can be employed wherein the polymerization temperature ranges from about 25° to about 80° C. Exemplary redox catalyst compositions include a peroxygen compound as described hereinbefore, preferably potassium persulfate or t-butyl hydroperoxide, and a reducing component such as sodium metabisulfite and sodium formaldehyde hydrosulfite. It is also suitable to employ various chain transfer agents such as mercaptans, e.g., dodecyl mercaptan, dialkyl xanthogen disulfides, diaryl disulfides, and the like.

Following emulsion polymerization, the emulsion polymerizate can be withdrawn from the polymerization vessel and (1) the emulsion employed as, or in, the erasable ink or (2) the unreacted monomer and other volatiles can be removed to provide a concentrated emulsion which is then used as, or in, the erasable ink or (3) the polymer particles can be recovered from the aqueous continuous phase of the dispersion by conventional means such as drying under vacuum or spray drying and, following any optional post-recovery operation such as washing, redispersed in an appropriate aqueous dispersion medium to provide the erasable ink.

The polymer-encapsulated colorant particles of the erasable ink composition of this invention will generally possess an average particle size of from about 25 to about 1000 nanometers and preferably from about 50 to about 250 nanometers. The fully formulated erasable ink composition, i.e., the aqueous dispersion of polymer-encapsulated colorant and any optional component(s), can possess a relatively low viscosity, e.g., from about 1 to about 80,000 centipoises and preferably from about 3 to about 30,000 centipoises, or a relatively high viscosity, e.g., at least about 100,000 centipoises and preferably at least about 500,000 centipoises. It will, of course, be recognized that when the erasable ink composition possesses such a high viscosity that it no longer readily flows solely under the influence of gravity, it becomes necessary to provide a pressurized delivery system for any marking instrument containing the ink.

To improve or optimize one or more functional characteristics of the erasable ink composition, one or more optional components can be added in the usual amounts to the composition, e.g., one or more natural and/or synthetic polymer latices, rheological modifiers, suspension agents, humectants, emulsifiers, surfactants, plasticizers, spreading agents, drying agents, release agents, parting agents, preservatives, antimicrobial agents, anticorrosion agents, antioxidants, coalescing aids, and the like.

With or without the addition of any optional component (s), the erasable ink composition when applied to a substrate, and particularly a porous substrate such as a cellulosic paper, and upon drying thereon is (1) sufficiently adherent to the substrate as to resist flaking therefrom and (2) substantially erasable. Thus, the dry erasable ink composition of this invention applied to paper and evaluated by the adherency test described infra will generally exhibit less than about 30 weight percent flaking, preferably less than about 20 weight percent flaking and even more preferably less than about 10 weight percent flaking. Erasability values delta $E^*ab$ of the erasable ink composition herein as measured by ASTM D-2244-89 will generally be on the order of less than about 4.0, preferably less than about 3.5 and even more preferably less than about 3.0.

It is preferred that the erasable ink composition herein when evaluated by the smearability test described infra exhibit a subjectively determined low level of smear, e.g., a smear value of 2 or less and preferably a smear value of 1 (i.e., essentially no smearing).

The erasable ink composition of this invention is intended to be used in any of a variety of marking instruments, and in particular, a ball-point pen.

The following examples are illustrative of the erasable ink composition of this invention.

EXAMPLES ILLUSTRATING THE
PREPARATION OF POLYMER-
ENCAPSULATED COLORANT

Example 1

The following ingredients were placed in a reaction bottle and stirred:

| Ingredient | Amount (g) |
| --- | --- |
| Water | 58.00 |
| Rosin Soap | 2.00 |
| $Na_3PO_4 \cdot 10H_2O$ | 0.17 |
| HEMA (Fe(II) complex of EDTA from Hampshire) | 0.02 |
| Sodium formaldehyde sulfoxyl | 0.03 |

Thereafter, the following ingredients were placed in the reaction bottle containing the above-identified ingredients and the bottle was capped:

| Ingredient | Amount (g) |
| --- | --- |
| Styrene | 9.00 |
| Dodecyl mercaptan | 0.07 |
| Butadiene (liquified) | 25.00 |
| Solvent Blue 36 (ICI/Zeneca, Wilmington, DE) | 1.00 |

A solution of cumene hydroperoxide (0.03 g) in styrene (1.00 g) was then added to the reaction bottle via syringe. The reaction bottle was agitated for about 12 to about 24 hours at approximately 15° C. to provide an emulsion polymerizate containing approximately 39.8 weight percent solids. The color of the resulting polymer-encapsulated colorant (dry) was blue. The average particle size (dry) of the polymer-encapsulated colorant was about 100 to about 200 nanometers. The calculated $T_g$ for the polymer-encapsulated colorant was approximately −46° C.

Example 2

The following ingredients were placed in a reaction kettle and stirred at approximately 60° C.:

| Ingredient | Amount (g) |
| --- | --- |
| Water | 260.4 |
| Alipal EP-120 (Anionic Surfactant from Rhône-Poulenc) | 3.2 |
| Sipo DS-4 (Anionic Surfactant from Rhône-Poulenc) | 3.2 |

A pre-emulsion was formed by admixing the following ingredients under stirring for 30 minutes at room temperature:

| Ingredient | Amount (g) |
| --- | --- |
| Water | 203.6 |
| Alipal EP-120 (Amine Surfactant from Rhône-Poulenc) | 9.0 |
| Sipo DS-4 (Anionic Surfactant from Rhône-Poulenc) | 3.2 |
| Acrylic acid | 3.2 |
| Itaconic acid | 3.2 |
| Butyl acrylate | 162.0 |
| 2-Ethylhexylacrylate | 162.0 |
| Acrylonitrile | 47.6 |
| Solvent Yellow (the condensation product of N,N-dimethyl-aminobenzaldehyde and ethylhexylcyanoacetate) | 9.5 |

The pre-emulsion (30 g) was added to the reaction kettle at about 60° C. and stirred for approximately 15 minutes. A solution of ammonium persulfate (0.6 g) in water (6.1 g) was added to the reaction kettle to initiate emulsion polymerization. The contents of the reaction kettle were stirred for approximately 15 minutes at about 60° C. An initiator solution formed by admixing water (48.3 g), Alipal EP-120 (anionic surfactant from Rhône-Poulenc) (1.9 g) and ammonium persulfate (0.8 g) was then placed in an addition funnel and added dropwise to the reaction kettle over a three hour period while maintaining the kettle at about 80° C. Similarly, the remaining portion of the pre-emulsion was introduced to the addition funnel and added dropwise to the reaction kettle over the 3 hour period while maintaining the temperature of the reaction kettle at 80° C. After all additions were complete, the temperature of the reaction kettle was maintained at 80° C. for approximately 1 hour. Thereafter, residual monomer remaining in the emulsion polymerizate was scavenged with four separate scavenger solutions of sodium formaldehyde sulfoxylate (Hydro AWC from Henkel) (0.15 g) in water (10 g) and a 70% solution of t-butylhydroperoxide (0.30 g) in water (5 g). The resulting emulsion polymerizate was neutralized to a slightly basic pH, i.e., from about 7.5 to about 8.5, utilizing Aqua Ammonia 28%. The emulsion polymerizate contained approximately 39.4 weight percent solids. The color of the resulting polymer-encapsulated colorant (dry) was yellow. The calculated $T_g$ for the polymer-encapsulated colorant was approximately −50° C.

The polymer-encapsulated colorants of Examples 1–2 can be directly employed as erasable ink compositions or be combined with one or more optional components as disclosed hereinabove prior to being employed as erasable ink compositions.

To further illustrate the erasable ink composition of this invention, the polymer-encapsulated colorant of Example 2 was combined with propylene glycol to provide an erasable ink composition (Example 3) containing 90 weight percent polymer-encapsulated colorant obtained from Example 2 and 10 weight percent propylene glycol.

The properties of the erasable ink composition of Example 3 were evaluated. In particular, the color intensity, viscosity, adherency, erasability and smearability of the erasable ink composition were evaluated.

Color intensity was evaluated by a subjective visual evaluation of script.

Adherency was determined by performing a drawdown on preweighed Linetta drawdown paper with approximately 0.8 g of sample (spread over an area of ¼ inch×1½ inch) and drawn down with a #6 cater-bar. The sample was allowed to dry completely (approximately 5 minutes at room temperature) and the paper was weighed again. The paper was then crumpled by hand, any flakes were blown off and the paper was reweighed. This test was also performed with erasable ink made according to U.S. Pat. Nos. 5,120,359 and 5,203,913 (Comparative Example 1).

Erasability was determined by performing an actual "WRITE-TEST" (similar to a spirograph wherein ink is applied in a circular arrangement on paper with some cross-over of ink occurring) with ball-point pens containing the erasable ink composition of Example 3 and the following commercially available pens which contain erasable ink:

| Pen | Ink Color | Comparative Example |
| --- | --- | --- |
| Erasermate | Blue | 2 |
| Erasermate 2 | Blue | 3 |
| Scripto | Blue | 4 |
| Scripto | Red | 5 |

The "WRITE-TEST" write-downs were then erased and reflectance measurements were performed on the erased portion of the paper versus an unblemished/untouched portion of the paper. A quantitative value was then obtained, i.e., delta E*ab from CIE lab measurement (described in ASTM D-2244-89). Lower values indicate more complete erasures.

Smearability was subjectively evaluated for the erasable ink composition of Example 3 and Comparative Examples 2–5 1–2 seconds after writing by attempting to smudge the ink with one's fingers. A smear value of 1 represents essentially no smearing and a smear value of 5 represents such a degree of smearing that legibility of the writing is significantly impaired.

Table I below presents the properties of the erasable ink compositions:

TABLE I

| Example | Color Intensity | Viscosity (cps) | Adherency (Wt. % of Dried Ink Composition Retained on the Paper) | Erasability Value (delta E*ab) | Smear Value |
|---|---|---|---|---|---|
| 3 | Comparable to Comparative Examples | ~3–10 | 100% | 3.56 | 1 |
| Comp. Ex. 1 | — | — | 63% | — | — |
| Comp. Ex. 2 | — | — | — | 3.3 | 2 |
| Comp. Ex. 3 | — | — | — | 3.63 | 2 |
| Comp. Ex. 4 | — | — | — | 5.38 | 3 |
| Comp. Ex. 5 | — | — | — | — | 4 |

As can be seen from the data presented in Table I, the erasable ink composition of Example 3 exhibited superior adherency and resistance to smear and comparative, if not superior, color intensity and erasability relative to the comparative examples. The erasable ink composition of this invention is highly adherent to substrates as to resist flaking therefrom, substantially erasable and substantially non-smearing.

While this invention has been disclosed herein in connection with certain embodiments and certain procedural details, it is clear that changes, modifications or equivalents can be used by those skilled in the art. Accordingly, such changes within the principles of this invention are intended to be included within the scope of the claims below.

What is claimed is:

1. An erasable ink composition which comprises an aqueous dispersion of a water-insoluble polymer-encapsulated colorant obtained by polymerizing under emulsion polymerization conditions at least one hydrophobic emulsion-polymerizable monomer containing dissolved colorant, the erasable ink composition when applied to a substrate and upon drying thereon exhibiting less than about 30 weight percent flaking based on the weight of the dried ink and an erasability value delta E*ab of less than about 4.0.

2. The erasable ink composition of claim 1 exhibiting less than about 20 weight percent flaking based on the weight of the dried ink and an erasability value delta E*ab of less than about 3.5.

3. The erasable ink composition of claim 1 exhibiting less than about 10 weight percent flaking based on the weight of the dried ink and an erasability value delta E*ab of less than about 3.0.

4. The erasable ink composition of claim 1 wherein the composition possesses a viscosity of from about 1 to about 80,000 centipoises.

5. The erasable ink composition of claim 1 wherein the composition possesses a viscosity of from about 3 to about 30,000 centipoises.

6. The erasable ink of claim 1 wherein the water-insoluble polymer-encapsulated colorant possesses an average particle size of from about 25 to about 1000 nanometers.

7. The erasable ink of claim 1 wherein the water-insoluble polymer-encapsulated colorant possesses an average particle size of from about 50 to about 250 nanometers.

8. The erasable ink composition of claim 1 wherein the monomer is selected from the group consisting of styrene, vinyl toluene, t-butyl styrene, chlorostyrene, vinyl benzyl chloride, vinyl pyridene, ethyl acrylate, methyl methacrylate, butyl acrylate, 2-ethylhexyl acrylate, vinyl acetate, vinyl chloride, vinylidene chloride, acrylonitrile, butadiene and isoprene.

9. The erasable ink composition of claim 1 wherein the colorant is a water-insoluble solvent dye.

10. The erasable ink composition of claim 9 wherein the water-insoluble solvent dye is selected from the group consisting of Sudan Red 380, Sudan Blue 670, Baso Red 546, Baso Blue 688, Sudan Yellow 150, Base Blue 645, Flexo Yellow 110, Flexo Blue 630, Oil Red 235, Morfast Yellow 101, Nitro Fast Yellow B, Macrolex Yellow 6G, Solvent Yellow 14, Solvent Yellow 16, Solvent Yellow 21, Solvent Orange 45, Solvent Orange 62, Solvent Red 1, Solvent Red 7, Solvent Red 8, Solvent Red 119, Solvent Red 125, Solvent Blue 5, Solvent Blue 14, Solvent Blue 25, Solvent Blue 36, Solvent Black 5, Solvent Black 34 and mixtures thereof.

11. The erasable ink composition of claim 1 wherein the colorant is a dyestuff precursor selected from the group consisting of triphenylmethane compounds, diphenylmethene compounds, xanthene compounds, thiazine compounds, spiropyran compounds and mixtures thereof.

12. The erasable ink composition of claim 1 further comprising at least one component selected from the group consisting of natural latices, synthetic latices, rheological modifiers, suspension agents, humectants, emulsifiers, surfactants, plasticizers, spreading agents, drying agents, release agents, parting agents, preservatives, antimicrobial agents, anticorrosion agents, antioxidants and coalescing aids.

13. The erasable ink composition of claim 1 wherein the monomer and dye are dissolved in a common solvent.

14. A marking instrument containing the erasable ink composition of claim 1.

15. The marking instrument of claim 14 which is a ball-point pen.

* * * * *